Figure 8:
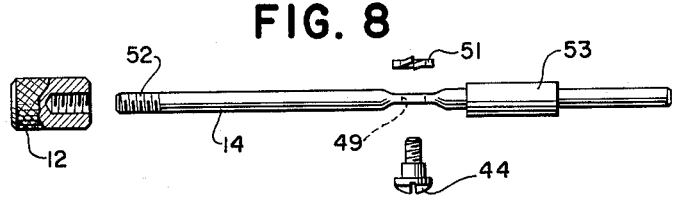

July 23, 1963
QUANG-HSI HU
3,098,538
NOVEL AND SAFETY PROCESS AND DEVICE FOR USE
IN CONNECTION WITH MOTOR VEHICLES
Filed Jan. 18, 1961
2 Sheets-Sheet 1
FIG. 1
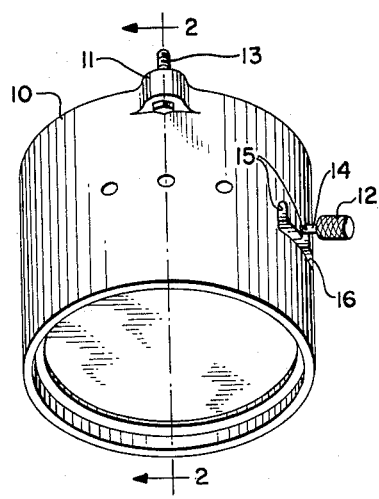
FIG. 2
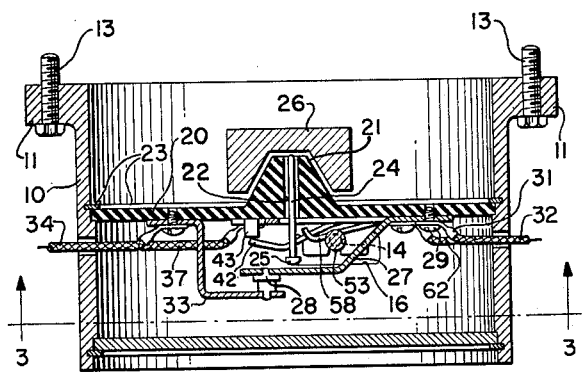
FIG. 4    FIG. 5
FIG. 3
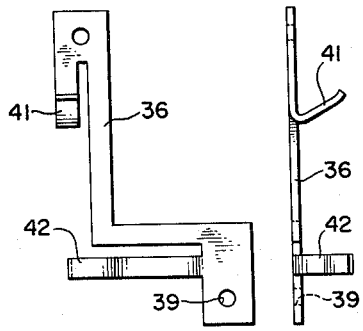
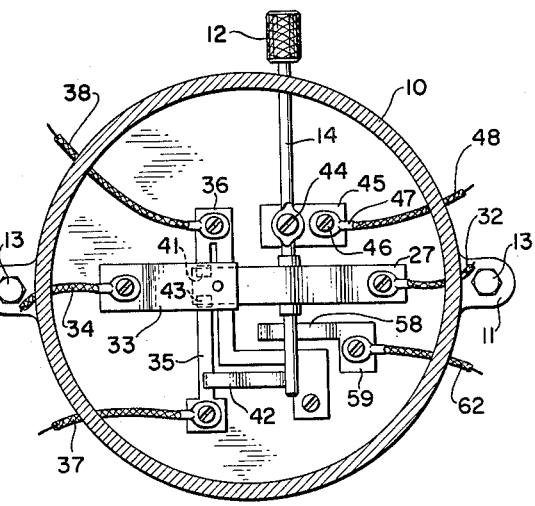
FIG. 6    FIG. 7
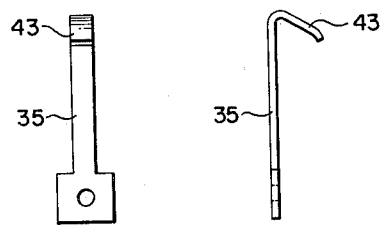
INVENTOR.
QUANG-HSI HU
BY
*Joseph F. Padlon*
ATTORNEY July 23, 1963 QUANG-HSI HU 3,098,538
NOVEL AND SAFETY PROCESS AND DEVICE FOR USE
IN CONNECTION WITH MOTOR VEHICLES
Filed Jan. 18, 1961 2 Sheets-Sheet 2

INVENTOR.
QUANG-HSI HU
BY
ATTORNEY

United States Patent Office 3,098,538
Patented July 23, 1963

3,098,538
NOVEL AND SAFETY PROCESS AND DEVICE FOR USE IN CONNECTION WITH MOTOR VEHICLES
Quang-Hsi Hu, Willard, N.Y.
Filed Jan. 18, 1961, Ser. No. 83,482
4 Claims. (Cl. 180—82)

This invention relates to safety devices for self-propelled farm tractors and the like, and more particularly to a novel warning and ignition circuit protective device adapted to ameliorate the effects of vehicular accidents.

It is well known that the damage resulting from motor vehicle accidents is frequently aggravated by the fact that the engine of the vehicle may continue to operate, even after impact or after the vehicle has turned over. The continued operation of the fuel pump under these circumstances increases the danger of fire occurring, since large quantities of gasoline may be pumped over hot engine parts due to leakage or rupture of fuel lines near the engine. In the case of mishaps to tractors or other large machinery which is overturned, the continued mechanical motion of the driving parts constitute a major danger to personnel.

A further danger occurs due to the fact that in many parts of the country accidents may occur in such an isolated location that due to the incapacity of the operator to summon assistance, there is danger that an accident may remain long undetected because of protective foliage or terrain when an automobile leaves the road, for example, or because of the sparsity of population and relatively great distances to the nearest assistance, in the case of farm machinery accidents.

These dangers I overcome by means of a novel accessory device adapted for inexpensive and inconspicuous installation within easy reach of the operator on the vehicle, and by means of which transpositions are made automatically in the electric wiring of the vehicle upon impact or overturning of the vehicle, to provide greater safety.

As a further feature of the invention, and because of its convenient location as aforesaid, as well as the access which it necessarily has to the electrical wiring system of the vehicle, it is found that the invention is easily arranged to provide substantial security from theft or unauthorized operation of the vehicle, as will be more fully described hereinafter.

It is therefore an object of this invention to provide an inertia and gravity responsive safety and warning device for self-propelled vehicles.

It is a further object of the invention to provide such a device capable of convenient and simple installation adjacent to the operator of a motor vehicle.

It is a still further object to provide such a device which is manually adjustable to provide visible and audible notice of tampering or theft of a vehicle.

It is another object of this invention to provide a safety device for vehicles which is responsive to both overturning and shock.

These and other objects of the invention I accomplish by means of a gravity and inertia sensitive member mounted in a receptacle in such manner that by physical displacement of the member, as caused by impact or overturning, intermediate connecting members are actuated to interrupt the electrical circuit operating the ignition system of the internal combustion engine, and simultaneously by the same means to actuate the horn and headlamps of the vehicle. Further provision is made for conveniently altering the electrical connections within the receptacle so that even under normal driving circumstances, the horn and headlamps are energized as a result of any attempt to start the engine by closing the ignition switch, thus warning of unauthorized operation.

Figure 9:
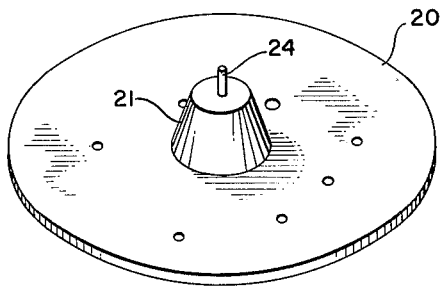
Figure 10:
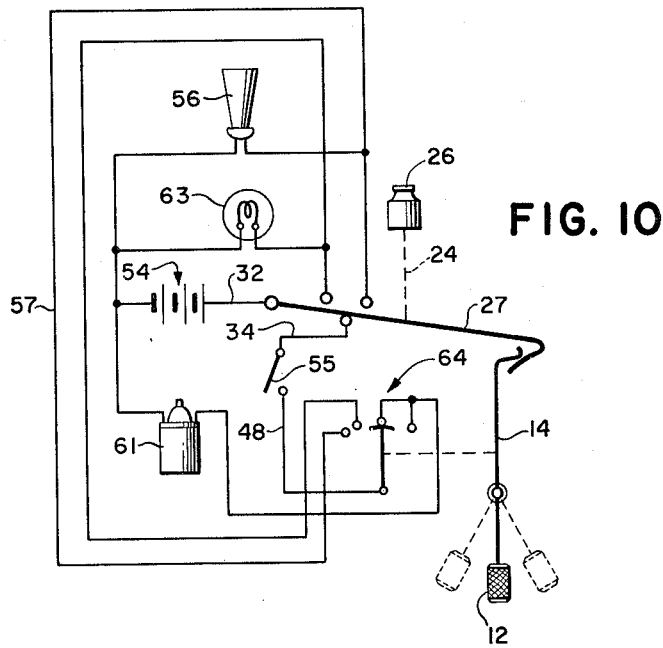

A fuller understanding of the invention may be had by reference to the following description of a preferred embodiment thereof taken in conjunction with the drawings, wherein:

FIG. 1 is a perspective view from the side of the instant invention;
FIG. 2 is a section taken on the line 2—2 of FIG. 1;
FIG. 3 is a section on the line 3—3 of FIG. 2;
FIG. 4 is a view of a portion of FIG. 3;
FIG. 5 is a side view of FIG. 4;
FIG. 6 is a view of a portion of FIG. 3;
FIG. 7 is a side view of FIG. 6;
FIG. 8 is an exploded view of a portion of FIG. 3;
FIG. 9 is a perspective view of a portion of FIG. 2; and
FIG. 10 is a schematic wiring diagram of the instant device.

Referring now to the drawings, there is seen in FIG. 1 a casing 10 of metal or other convenient material of suitable strength for the purpose, in the form of a cylinder having mounting ears such as 11 spaced around its upper periphery, cast in place, or otherwise secured to the casing 10 for the purpose of retaining it in place on the vehicle through the agency of bolts such as 13 fastened preferably into the lower edge or rolled back portion at the lower extremity of a vehicle instrument panel, within easy reach of the operator. It is convenient further to locate casing 10 in close proximity to the ignition switch of the vehicle, or between the locations of the ignition switch and the headlamp switch, for the reason that electrical connections later to be described are made to the electrical wiring associated with these devices, and by such location will be shortened.

There is further seen in FIG. 1 an operating handle 12 terminating a shaft 14 which protrudes from the casing 10 in a recess such as 15 in a slot 16. Handle 12 swings shaft 14 in the slot 16, being detented in recesses such as 15, as later explained.

In FIG. 2 there is seen deck 20 of insulating material having a conical protuberance 21 provided with a central hole 22 and retained in place on a shoulder in the casing 10 by means of a ring 23 in well-known manner. A pin 24 having a head 25 slides freely in the hole 22 and normally is retained in the depressed position shown, by means of the gravity and inertia responsive weight 26 which has a recess on its underside adapted to receive and engage the conical protuberance 21 as seen clearly in FIG. 9. It will be seen that overturning the assembly thus far described will cause the weight 26 to be displaced so that the pin 24 is free to protrude from the conical protuberance 21 as shown in FIG. 9 but it is also important for the purposes of this invention that the weight 26 also be responsive to any lateral impact of dangerous intensity, while remaining uninfluenced by ordinary shocks and bumps encountered by vehicles in the ordinary course of operation. This is accomplished by selecting the apex angle and height of the conical protuberance 21, and the material used therefor and for the weight 26 such that when considered together with the density of the weight a satisfactory shock filtering effect will be produced by the mechanical combination.

The desired result of insensitivity to small lateral impulses and immediate response to large ones is favored by the use of materials for cone and weight having a relatively high coefficient of friction, and relatively high density of the weight. Care must be taken, however that the apex angle of the cone always exceeds the appropriate minimum for the particular coefficient of friction employed. A lead weight on a cone of phenolic material having an apex angle of 42° constitute one suitable choice.

The head 25 bears downwardly on a flexible strip of resilient metal 27 provided with a suitable electrical contact point 28 of such a material as fine silver, intended to insure continued high conductivity despite long exposure to the corrosive influences of the atmosphere, and is retained in place on the deck 20 by means of a screw 29 which also retains a terminal 31 on a wire 32 protruding through case 10. It is obvious that to insure increased stability of the assembly a plurality of screws instead of the single screw 29 may be used, especially since screw 29 is required to be loosened when the lug 29 is applied thus allowing the strip 27 to be displaced, but these secondary fastening means which may be in the form of additional screws, eyelets, rivets, lugs or other means, are not shown on the drawings for reasons of clarity and the fact that their function and use is well known in the art.

A contact strip 33 has associated with it the contact, screw and lug (not numbered) and the wire 34, and is formed of rigid metal in the shape shown, and secured in such position that it remains in electrical connection with the strip 27 by reason of the pressure from the pin 24 thereon, the strip 27 bending resiliently upward to break the connection upon removal of the pressure of pin 24 as may be caused by displacement of the weight 26 to the position shown, which is its position in the instant before such resilient opening of the contacts occurs.

A pair of metal contact strips 35 and 36 are seen more clearly in FIG. 3 and are similarly fastened by lugs and screws into the deck 20, to wires 37 and 38 respectively. An enlarged view of strip 36 seen in FIGS. 4 and 5 shows the screwhole 39, a downwardly bent contacting portion 41, and a resiliently disengaged but depressible portion 42 for contacting the strip 35 upon depression. Strip 35 seen in FIGS. 6 and 7 has a similar contacting portion 43 for location adjacent to the similar element 41 to form a pair of jaws.

The shaft 14 is seen in FIG. 3 to be fastened to deck 20 by means of a screw 44 which also retains the strip 45, as does the screw 46, which also retains lug 47 and its emergent wire 48. As seen more clearly in FIG. 8, the metal shaft 14 has a flattened portion provided with a hole 49 through which the screw 44, which is a shoulder screw, attaches it swingably to the deck 20 and slightly spaced therefrom by means of a spring washer 51. It has a thread 52 on one end to retain the operating handle 12 which is correspondingly tapped, and carries a sleeve of insulating material 53 near its other extremity. As seen in FIG. 3 it is hinged to cause sleeve 53 to swing into contact with an inclined portion of strip 27 on its remote side, thus effecting and retaining circuit closure between wire 32, connected to battery 54, as seen in FIG. 10, and wire 34 to the ignition switch 55. This closure occurs with handle 12 in the left position of FIG. 10, and is an emergency position providing for bypass of the normal function of the device.

Shaft 14 is itself energized by wire 48 leading from the ignition switch. In the center position of FIG. 10 which is the normal operating position and is represented by retention of shaft 14 in the appropriate recess 15 of FIG. 1, connection is made by contact between shaft 14 and depressible portion 58 of strip 59 connected to the ignition coil 61 by the wire 62 so that the ignition switch 55 controls the coil in the customary manner. Sleeve 53 is not then in contact with strip 27, however, and connection between battery 54 and ignition switch 55 is retained only for so long as weight 26 remains undisturbed. Upon displacement of weight 26 by shock or overturning, resilient strip 27 lifts pin 24 and engages the jaws formed by portions 41 and 43 of strips 36 and 35 respectively, connecting them together and to the strip 27 and thus energizing the horn 56 and headlights such as 63.

In the right hand position of handle 12 in FIG. 10, shaft 14 is so moved as to depress a depressible portion 42 of the strip 36, making contact with it and causing it to make contact with the underlying strip 35. By this connection, the ignition switch 55 is connected to the horn and lights, so that when turned on, it will cause them to operate. In this position of the switch 12 the instant invention is effective in making theft of the automobile by persons unfamiliar with the features of the device more difficult.

Althought his invention has been described in terms of a specific illustrative example of a preferred embodiment thereof, it is to be understood that various modifications and elaborations will occur to those skilled in the art which do not, however, depart from the essential spirit of the invention disclosed, and it is therefore intended that the invention be limited only by the appended claims.

What is claimed is:

1. In a vehicle having an electrical ignition switch and warning devices, gravity and inertia responsive weight means having a conical mounting recess therein, mounting and supporting means therefor having a conical mounting portion thereon and a hole therethrough aligned with said mounting portion, a despressible pin in the hole, switch means located beneath the hole on said supporting means, having a flexible and resiliently upwardly urged contact bearing member thereon, normally depressed to a closed condition by reason of said weight means acting through pressure of said pin thereon to energize said ignition switch, and a pair of back contacts on said supporting means, contactable by said contact bearing member when undepressed, for energizing said warning devices.

2. The device of claim 1 wherein there is a manually operable lever having three positions of operation effective for swinging into a first position to forcibly depress said contact bearing member for overridingly energizing said ignition switch in a second position for energizing said contact bearing member, and in a third position for energizing said warning devices.

3. The device of claim 2 wherein there is a contact finger on one of the said back contacts which is normally poised in switch relationship over the other of said back contacts, the said lever is connected for energization through said ignition switch by closure of said contact bearing member, and is operative in said third position to contact and depress the finger.

4. Agricultural motor vehicle distress signal means for motor vehicles having an electrical ignition circuit switch and a horn, which comprises resiliently biased switch means connected for electrical ignition circuit operation in the unbiased position, and for ignition circuit electrical connection breaking and horn actuation in the biased position, conically protuberant deck means and gravity and inertia responsive weight means thereon having an underside recessed to receive and engage by contact the said conical protuberance of the said deck means, the said deck means and the said weight means being constructed of materials such as to have engaging surfaces in contact whose coefficient of friction together with the density of said weight means and the apex angle and height of said conical protuberance of said deck means are such as to cause said weight means to remain substantially uninfluenced by lateral shocks and bumps of intensity encountered in the ordinary course of vehicle operation, said free weight means being normally in contact with said switch means and effective by its weight to maintain said switch means in the unbiased position, and manual switch means to connect the horn to the ignition circuit switch, whereby only collision shock and overturn are effective to displace the weight means for interrupting ignition and sounding the horn, but manual switch means operation causes horn sounding upon subsequent ignition switch closure.

References Cited in the file of this patent

UNITED STATES PATENTS

| | | |
|---|---|---|
| 1,313,544 | Knell | Aug. 19, 1919 |
| 1,408,996 | Erickson | Mar. 7, 1922 |
| 1,915,267 | Bigelow | June 27, 1933 |
| 2,258,539 | Cosner | Oct. 7, 1941 |
| 2,428,029 | Katcher | Sept. 30, 1947 |
| 2,947,830 | Goss | Aug. 2, 1960 |
| 2,984,820 | Kennell | May 16, 1961 |

FOREIGN PATENTS

| | | |
|---|---|---|
| 734,940 | France | Aug. 13, 1932 |